(12) United States Patent
Bäck et al.

(10) Patent No.: US 6,505,044 B1
(45) Date of Patent: Jan. 7, 2003

(54) INDICATOR IN THE MOBILITY MANAGEMENT (MM) PROCEDURES TO SPECIFY THE PROCEDURE TYPE EXECUTED IN THE CORE NETWORK (CN) ENTITIES

(75) Inventors: Juha Bäck, Helsinki (FI); Heikki Einola, Espoo (FI); Tony Hulkkonen, Helsinki (FI); Seppo Huotari, Espoo (FI); Lauri Lahtinen, Espoo (FI); Khiem Le, Coppell, TX (US); Heikki Lindholm, Espoo (FI); Jaakko Rajaniemi, Helsinki (FI); Juha Timonen, Oulu (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/159,711

(22) Filed: Sep. 24, 1998

(51) Int. Cl.[7] ................................................. H04Q 7/20
(52) U.S. Cl. ....................................................... 455/445
(58) Field of Search ............................... 455/433, 445, 455/426, 560, 13.1

(56) References Cited

U.S. PATENT DOCUMENTS 5,548,801 A * 8/1996 Araki et al. ................. 455/13.1
6,104,929 A * 8/2000 Josse et al. .................. 455/445

FOREIGN PATENT DOCUMENTS

WO    WO 98/23119    5/1998
WO    WO 98/32304    7/1998

* cited by examiner

Primary Examiner—William Cumming
(74) Attorney, Agent, or Firm—Altera Law Group LLC (57) ABSTRACT

A method, a system, or an article of manufacture provides Mobility Management (MM), for example, an update procedure, in a Core Network (CN) of a mobile communication system. The Mobile Station (MS) includes an indicator which defines an update type. The update type includes: all CN entities; one type of CN entity only. If the indicator has the update type of all CN entities, the MS registers all CN entities. If the indicator has the update type of one type of CN entity only, the MS registers the one type of CN entity only. The CN entities may be MSC/NVLR CN entity, SGSN CN entity, or other CN entity. The method includes the MS determining to which of the CN entity to perform the update procedure; the MS updating the CN entity; the CN acknowledging the MS whether update is successful or failed; and the CN acknowledging the MS whether update of other CN entity is needed, if needed, the CN defining to which of the CN entity to perform update, and continuing the update of the defined CN entity. The MS does not have to know the services subscribed to a user, nor does the MS have to know the configuration of the CN.

27 Claims, 9 Drawing Sheets

INDICATOR IN THE MOBILITY MANAGEMENT (MM) PROCEDURES TO SPECIFY THE PROCEDURE TYPE EXECUTED IN THE CORE NETWORK (CN) ENTITIES

BACKGROUND OF THE INVENTION

1. Indicator of the Invention

This invention relates in general to a mobile cellular communication system, more particularly to a mobile cellular communication system used in $2^{nd}$ and $3^{rd}$ generation mobile cellular system, and more still particularly to an indicator in mobility management (MM) procedures to specify a procedure type executed in Core Network (CN) entities.

2. Description of Related Art

Cellular systems have had a direct effect on the lives of millions over the past few years. For the first time, people are able to make and receive phone calls without being tied to a specific location. Mobile phones, as part of the cellular systems, have allowed people to break the tie between location and access to communication. Mobile phones have also allowed people to reach another who is in move. With the development in cellular systems, people are allowed to reach another who is mobile in anywhere at anytime.

The first generation of mobile communication systems were born in the early 1980s. The marriage of radio and telephone technologies gave birth to mobile phones and triggered a turning point in telecommunications. Adding radio access to a telephone network meant that for the first time in history, the concept of a telephone being at a fixed point in the network was no longer valid. The benefits of being able to make and receive telephone calls anywhere had appeal to business people—the original market. In the first generation of cellular networks, analog wireless technology were used for the user connection (called the "air interface"). Every voice channel had its own narrow frequency band, using a technology called Frequency Division Multiple Access (FDMA).

However, as the demand for mobile phones grew and grew, regularly exceeding forecasts, it became obvious that the available radio spectrum would not be adequate to accommodate the expected numbers of mobile phone users. The digital technology became the solution to the problem. The answer lay in new digital wireless technologies that allow larger numbers of mobile subscribers to be supported within a given frequency allocation. Time Division Multiple Access (TDMA) technology is used in which a broader frequency channel is divided into intermittent time-slots, i.e. several calls share the same frequency channel at any one time. The digital technology also offered other important benefits. It provided better voice quality and improved security against unauthorized eavesdropping. Another technology, Code Division Multiple Access (CDMA) has also been developed subsequently to increase capacity.

The first and second generation mobile communication systems were mainly set to support voice communications, although today's mobile phones can also be used for data transfer at rates that are acceptable for relatively low-speed data applications such as sending and receiving of faxes and e-mail. However, these systems do not support high-speed data or video applications. The third generation mobile communication system is being developed to remove the bandwidth bottleneck and support a whole new range of voice, data, video, and multimedia services. For example, smart messaging is bringing Internet services to every mobile user's fingertips. As people become used to the freedom that mobile communications have provided, they will become more demanding about the information and services required to benefit their lives.

The demand by consumers all over the world for mobile communications service continues to expand at a rapid pace and will continue to do so for at least the next decade. To satisfy such demand, more and more innovative mobile telecommunications networks are being built in this growing industry.

In the $3^{rd}$ generation cellular systems, many practical techniques are being developed over the past few years. The mobile telecommunication network comprises switching functions, service logic functions, database functions, and Mobility Management (MM) functions that enable subscribers to be mobile. These are some of the functions provided by Mobile Switching Centers (MSCs) for serving Circuit Switched (CS) connections, by Visitor Location Registers (VLR) for serving CS connections, or by other network entities, for example, Serving GPRS Support Node (SGSN) for Packet Switched (PS) connections (GPRS refers to General Packet Radio System).

Generally, the database in the Core Network (CN) keeps tracks of the location of Mobile Stations (MSs). In one case, the CN comprises both entities, MSC (or MSC/VLR) and SGSN, to implement such database. Each of the MSs can have a location update service, a CS or PS connection service from the CN by sending radio signals to its Base Station (BS). Each of the BSs is controlled by a Radio Network Controller (RNC) which connects to the CN.

In the existing mobile telecommunication systems, e.g. the $2^{nd}$ generation mobile telecommunication systems, the Core Network (CN) only has MSC/VLR CN entity for serving Circuit Switched (CS) connections, and the CN configuration is simply a CN with MSC/VLR CN entities. Accordingly, the Mobile Station (MS) knows the configuration of the CN as well as the type of services subscribed to a user, i.e. CS connection service. Further, a registration procedure, such as a location update by the MS can also be readily done.

However, more and more mobile telecommunication systems are developed to have different kinds of CN configurations and different types of CN entities, e.g. a $3^{rd}$ generation mobile telecommunication system. The CN of the $3^{rd}$ generation mobile telecommunication system may include a variety of CN entities, such as SGSN CN entity, MSC/VLR CN entity, etc. Further, the CN may have a separate MSC/VLR CN entity and SGSN CN entity configuration, a separate but connected by Gs interface MSC/VLR CN entity and SGSN CN entity configuration, an integrated MSC/SGSN CN entity configuration. Accordingly, a Mobile Station (MS) does not necessarily know which services are subscribed to a user. For example, in Global System for Mobile communications (GSM), this information is held in the Home Location Register (HLR). Thus, the MS does not know where to perform a registration procedure, such as location update, or which type of service is desired by the user, e.g. CS or PS attach/detach service, or other Mobility Management (MM) procedures.

Accordingly, there is a need for a solution to providing MM procedures of a Mobile Station (MS) in a Core Network (CN) of a mobile telecommunication system regardless of the CN configuration and regardless of the types of CN entities in the CN.

SUMMARY OF THE INVENTION

To overcome the limitations or problems in the prior art described above, and to overcome other limitations that will become apparent upon reading and understanding the present specification, the present invention provides a method, a system, and article of manufacture for providing Mobility Management (MM) procedure of a Mobile Station (MS) in a Core Network (CN) of a mobile telecommunication system.

The present invention solves the above-described problems by providing an indicator in Mobility Management (MM) procedures, e.g. location update, or attach/detach procedure, to specify the procedure type executed in the Core Network (CN) entities.

When a Mobile Station (MS) executes location update, detach, or attach MM procedure (hereafter referred to as update procedure), there is an indicator in a Mobility Management (MM) message, which describes the update type, e.g. for all entities (including MSC/VLR CN entity and SGSN CN entity, etc.), for MSC/VLR CN entity only, or for SGSN CN entity only, etc. Accordingly, the MS updates all possible CN entities when the indicator the update type is for all entities, the MS only updates MSC/VLR CN entity when the indicator of the update type is for MSC/VLR CN entity only, and the MS only updates SGSN CN entity when the indicator of the update type is for SGSN CN entity only. This indicator is sent with the MM message, which requests the update from the CN, e.g. location update request, attach request and detach request message, etc.

The CN entity next updates the HLR (Home Location Register) and then sends an acknowledgment message back to the MS (in case of a detach procedure, the CN entity may not send an acknowledgment back to the MS). The CN entity indicates in the acknowledgment message the entities that were updated. The CN entity also indicates in the acknowledgment message the entities that still are to be updated. There are many different options to perform the update because of the different types of CN entities and different CN configurations. The CN receives this information from the Home Location Register (HLR) where information of the services that MS has subscribed is stored.

In one embodiment of the present invention, there is a method for providing a mobility management procedure of a Mobile Station (MS) in a Core Network (CN) of a mobile telecommunication system, the CN including a plurality of CN entities, comprising:

a) determining, by the MS, to which of the CN entities to perform the update procedure;

b) updating, by the MS, the CN entity;

c) acknowledging the MS, by the CN, whether update is successful or failed; and d) acknowledging the MS, by the CN, whether update of other CN entity is needed, if needed, defining, by the CN, to which of other CN entity to perform update, and continuing b)–d).

In one aspect of the present invention, the MS has an indicator which defines an update type. The update type includes one of: all CN entities; one type of CN entity only, such that if the indicator has the update type of all CN entities, the MS updates the all CN entities; and if the indicator has the update type of one type of CN entity only, the MS updates the one type of CN entity only.

In another aspect of the invention, the plurality of the CN entities include a SGSN (Serving GPRS Support Node) CN entity, a MSC/VLR (Mobile Switching Center/Visitor Location Register) CN entity, such that if the indicator has the update type of all CN entities, the MS updates the all CN entities including all of the SGSN CN entity and the MSC/VLR CN entity; if the indicator has the update type of SGSN CN entity only, the MS updates the SGSN CN entity only; if the indicator has the update type of MSC/VLR CN entity only, the MS updates the MSC/VLR CN entity only.

In one embodiment of the invention, the CN is a CN with separate MSC/VLR CN entity and SGSN CN entity. If the indicator has the update type of all entities, the MS registers the MSC/VLR CN entity, the CN acknowledges that the update of the MSC/VLR CN entity is successful and that update of SGSN CN entity is needed. Upon receipt of the acknowledgment from the CN that update of SGSN CN entity is needed, the MS registers the SGNS CN entity, the CN acknowledges that the update of the SGSN CN entity is successful and that no update of other entity is needed.

Further in one embodiment of the present invention wherein the CN is a CN with separate MSC/VLR CN entity and SGSN CN entity, if the indicator has the update type of all entities, the MS registers the SGSN CN entity, the CN acknowledges that the update of the SGSN CN entity is successful and that update of MSC/VLR CN entity is needed. Upon receipt of the acknowledgment from the CN that update of MSC/VLR CN entity is needed, the MS registers the MSC/VLR CN entity, the CN acknowledges that the update of the MSC/VLR CN entity is successful and that no update of other entity is needed.

Still in one embodiment of the present invention wherein the CN is a CN with separate MSC/VLR CN entity and SGSN CN entity, if the indicator has the update type of MSC/VLR CN entity only, the MS registers the MSC/VLR CN entity, the CN acknowledges that the update of the MSC/VLR CN entity is successful and that no update of other CN entity is needed.

Yet in one embodiment of the present invention wherein the CN is a CN with separate MSC/VLR CN entity and SGSN CN entity, if the indicator has the update type of SGSN CN entity only, the MS registers the SGSN CN entity, the CN acknowledges that the update of the SGSN CN entity is successful and that no update of other CN entity is needed.

In another embodiment of the present invention, the CN is a CN with separate but connected by Gs interface MSC/VLR CN entity and SGSN CN entity. If the indicator has the update type of all entities, the MS registers the MSC/VLR CN entity first and then registers the SGSN CN entity via the Gs interface, the CN acknowledges that the update of the MSC/VLR CN entity and the SGSN CN entity is successful and that no update of other entity is needed.

Alternatively, in another embodiment of the invention, the CN is a CN with separate but connected by Gs interface MSC/VLR CN entity and SGSN CN entity. If the indicator has the update type of all entities, the MS registers the SGSN CN entity first and then registers the MSC/VLR CN entity via the Gs interface, the CN acknowledges that the update of the SGSN CN entity and the MSC/VLR CN entity is successful and that no update of other entity is needed.

Further in another embodiment of the invention wherein the CN is a CN with separate but connected by Gs interface MSC/VLR CN entity and SGSN CN entity, if the indicator has the update type of MSC/VLR CN entity only, the MS registers the MSC/VLR CN entity, the CN acknowledges that the update of the MSC/VLR CN entity is successful and that no update of other entity is needed.

Still in another embodiment of the invention wherein the CN is a CN with separate but connected by Gs interface MSC/VLR CN entity and SGSN CN entity, if the indicator has the update type of SGSN CN entity only, the MS registers the SGSN CN entity, the CN acknowledges that the update of the SGSN CN entity is successful and that no update of other entity is needed.

In an alternative embodiment of the invention, the CN is a CN with integrated MSC/SGSN CN entity. If the indicator has the update type of all entities, the MS registers the MSC/SGSN CN entity, the CN acknowledges that the update of the MSC/SGSN CN entity is successful and that no update of other entity is needed.

Further in an alternative embodiment of the invention wherein the CN is a CN with integrated MSC/SGSN CN entity, if the indicator has the update type of MSC/VLR CN entity only, the MS registers the MSC CN entity, the CN acknowledges that the update of the MSC CN entity is successful and that no update of other entity is needed.

Still in an alternative embodiment of the invention wherein the CN is a CN with integrated MSC/SGSN CN entity, if the indicator has the update type of SGSN CN entity only, the MS registers the SGSN CN entity, the CN acknowledges that the update of the SGSN CN entity is successful and that no update of other entity is needed.

Another aspect of the invention is that the update includes location update, a circuit switch attach/detach, or a packet switch attach/detach.

The present invention also provides a system of providing an update procedure in a mobile telecommunication system. In one embodiment, the system includes:

a Core Network (CN), the CN including a plurality of CN entities;

a Mobile Station (MS), the MS determining to which of the CN entities to perform the update procedure and updating the CN entity; and wherein after update of the CN entity, the CN acknowledging the MS whether update is successful or failed, and whether update of other CN entity is needed, if needed, the CN defining to which of other CN entity to perform update and continuing update of the other CN entity.

One advantage of the present invention is that it provides means for handling different kinds of CN configurations or architectures when MS is executing MM procedures in a mobile communication network system.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

This invention relates in general to a mobile cellular communication system, more particularly to a mobile cellular communication system used in $2^{nd}$ and $3^{rd}$ generation mobile cellular system, and more still particularly to an indicator in mobility management (MM) procedures to specify a procedure type executed in Core Network (CN) entities.

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

Figure 1:
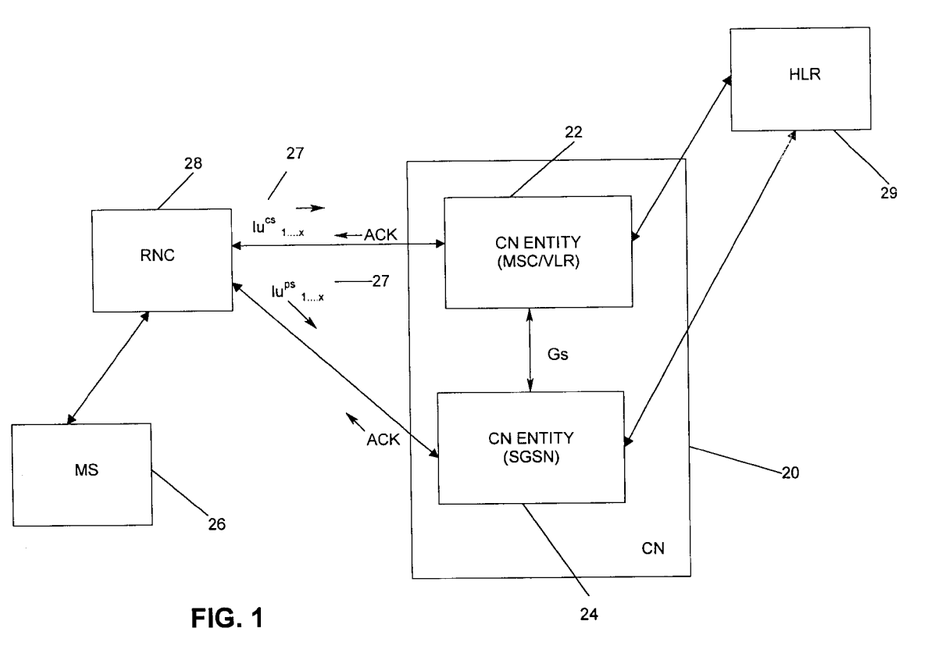
FIG. 1 illustrates an update procedure of a Mobile Station (MS) in a first Core Network (CN) of a mobile telecommunication system in accordance with the present invention.
Figure 2:
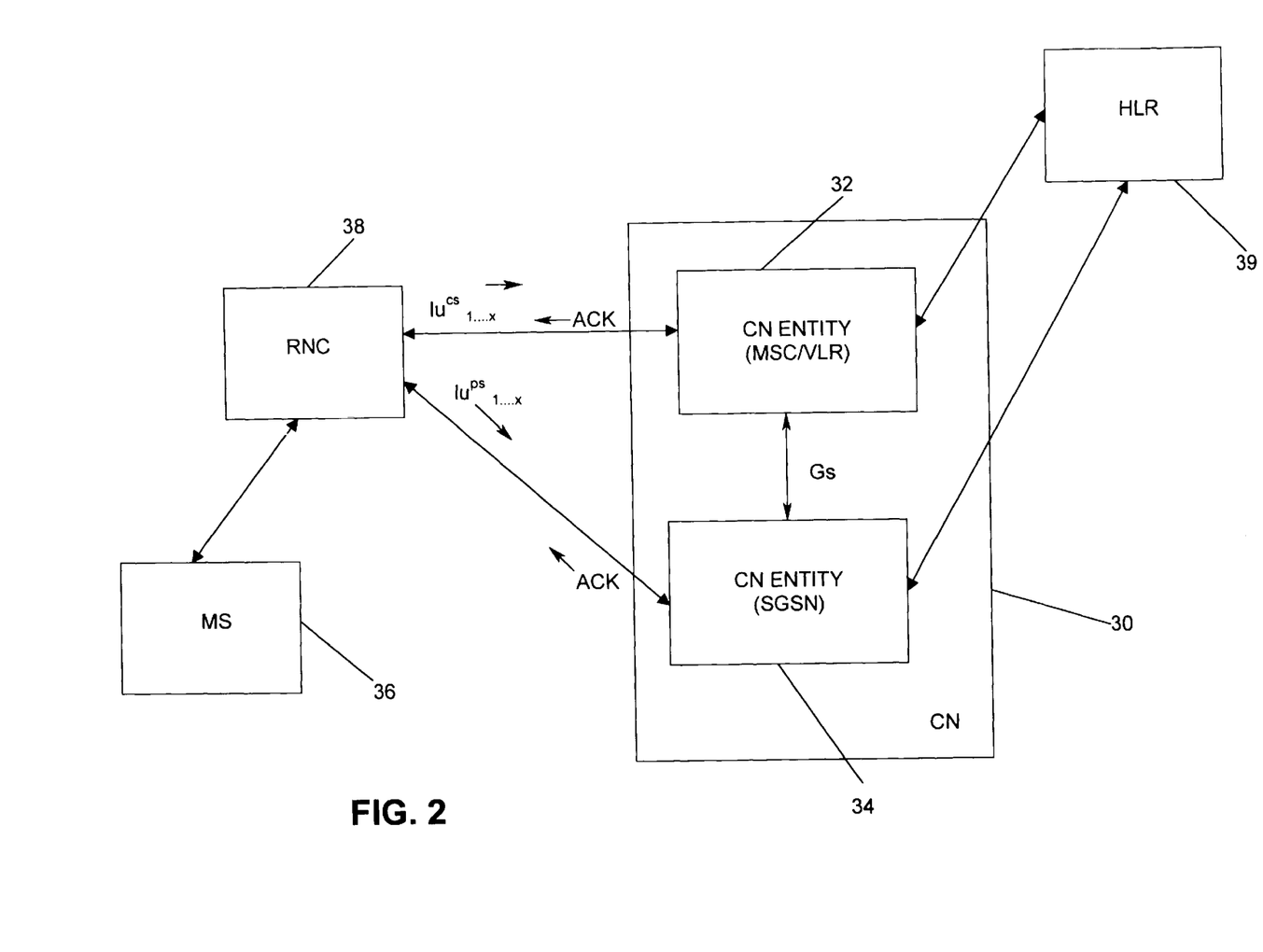
FIG. 2 illustrates an update procedure of a Mobile Station (MS) in a second Core Network (CN) of a mobile telecommunication system in accordance with the present invention.
Figure 3:
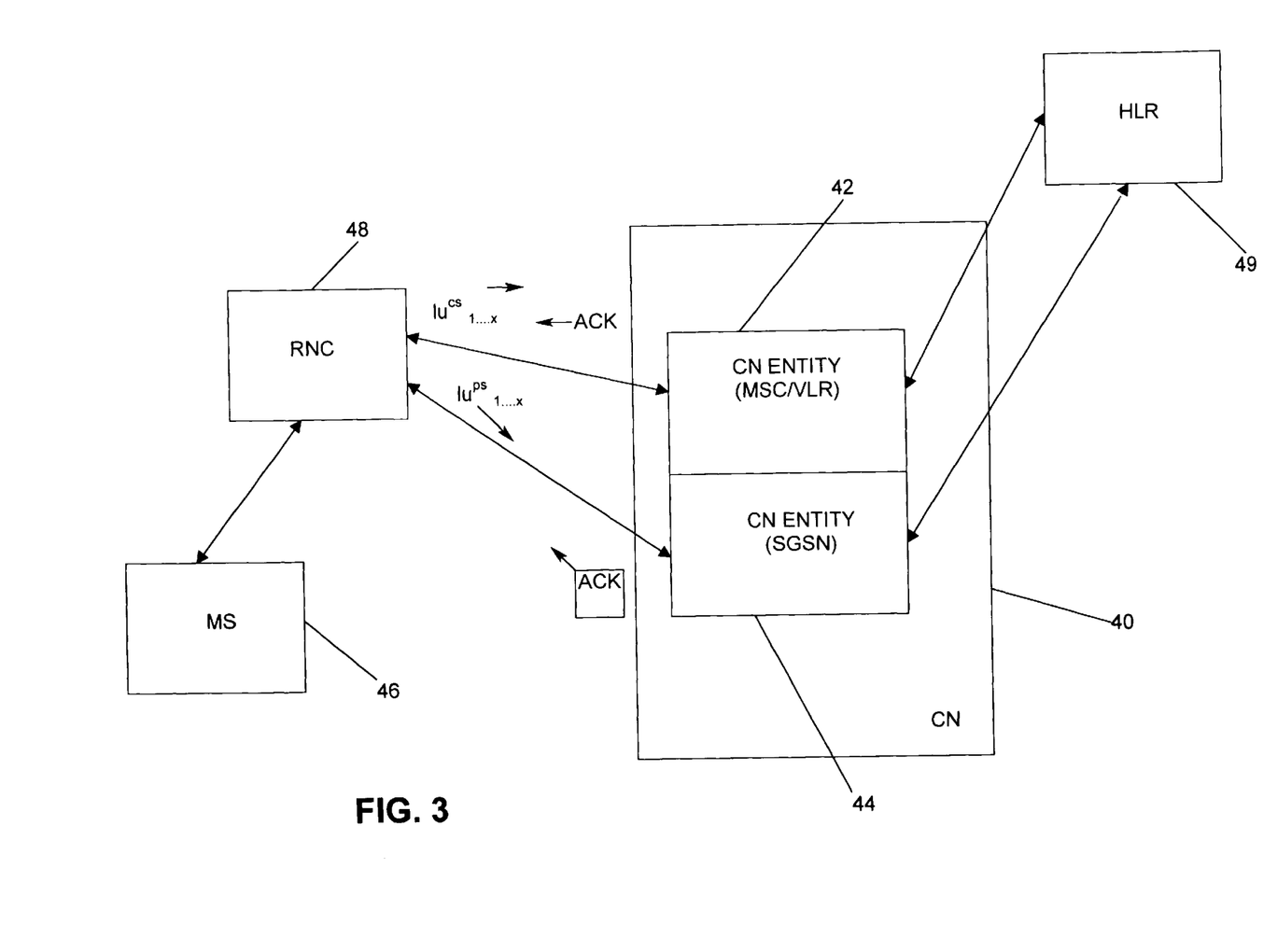
FIG. 3 illustrates an update procedure of a Mobile Station (MS) in a third Core Network (CN) of a mobile telecommunication system in accordance with the present invention.

In FIGS. 1–3, three exemplary Core Network (CN) configurations are shown. It is appreciated that other CN configurations can be used without departure from the principles of the present invention.

Figure 5:
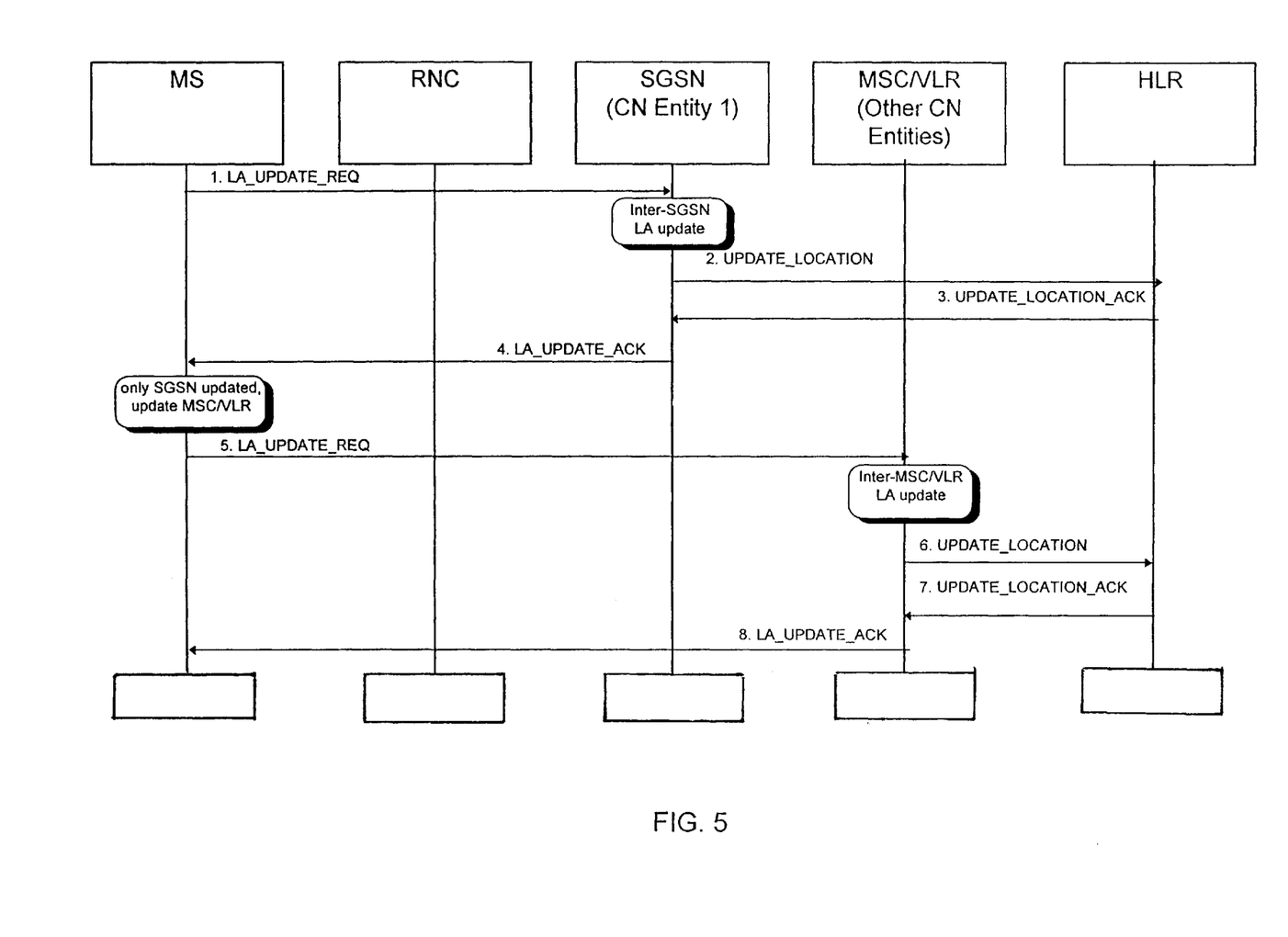
FIG. 5 illustrates one type of update procedure, i.e. a location update, of a Mobile Station (MS) in the first Core Network (CN) with separate CN entities in accordance with the present invention.
Figure 6:
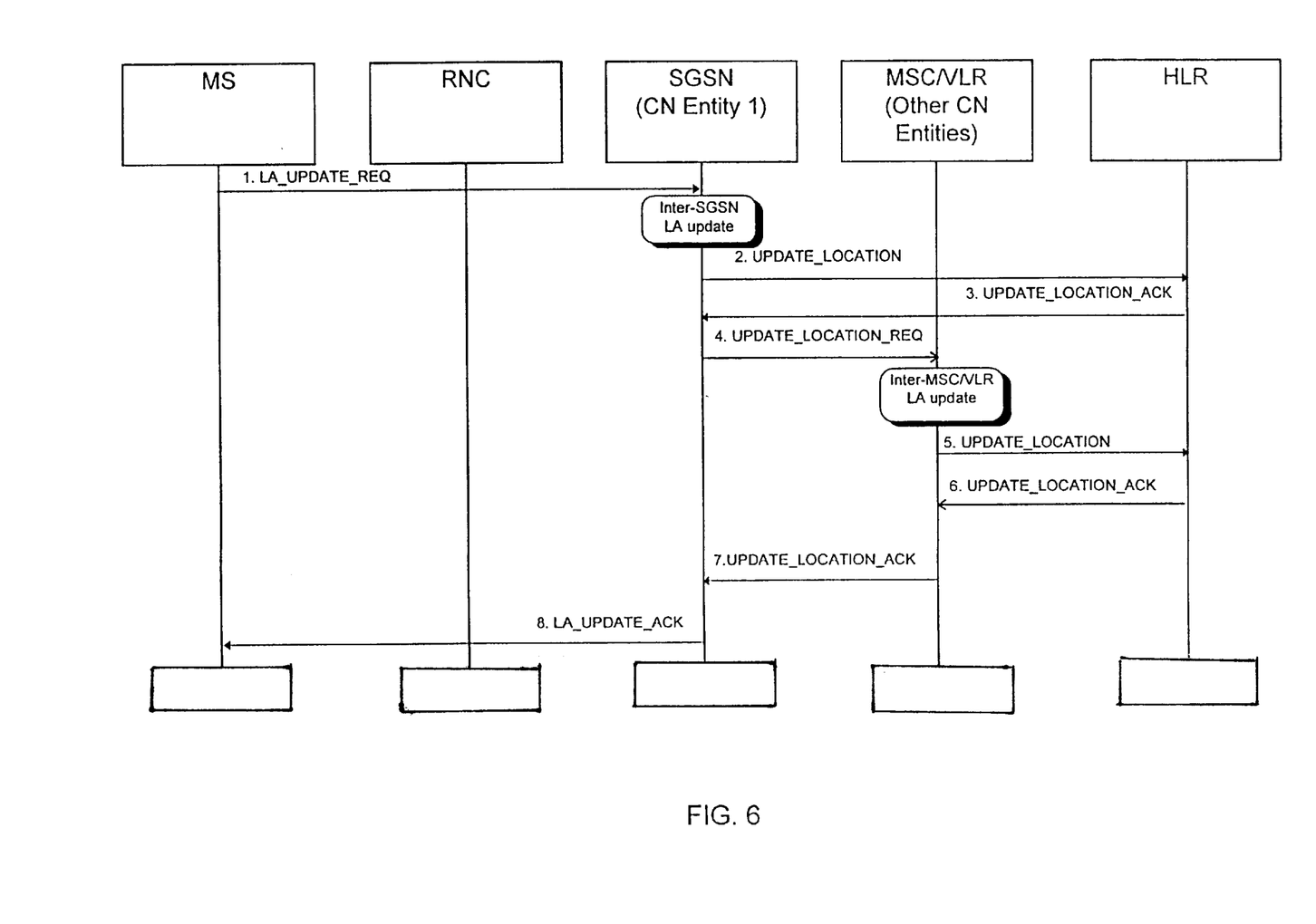
FIG. 6 illustrates one type of update procedure, i.e. a location update, of a Mobile Station (MS) in the second Core Network (CN) with separate CN entities having interface Gs in accordance with the present invention.
Figure 7:
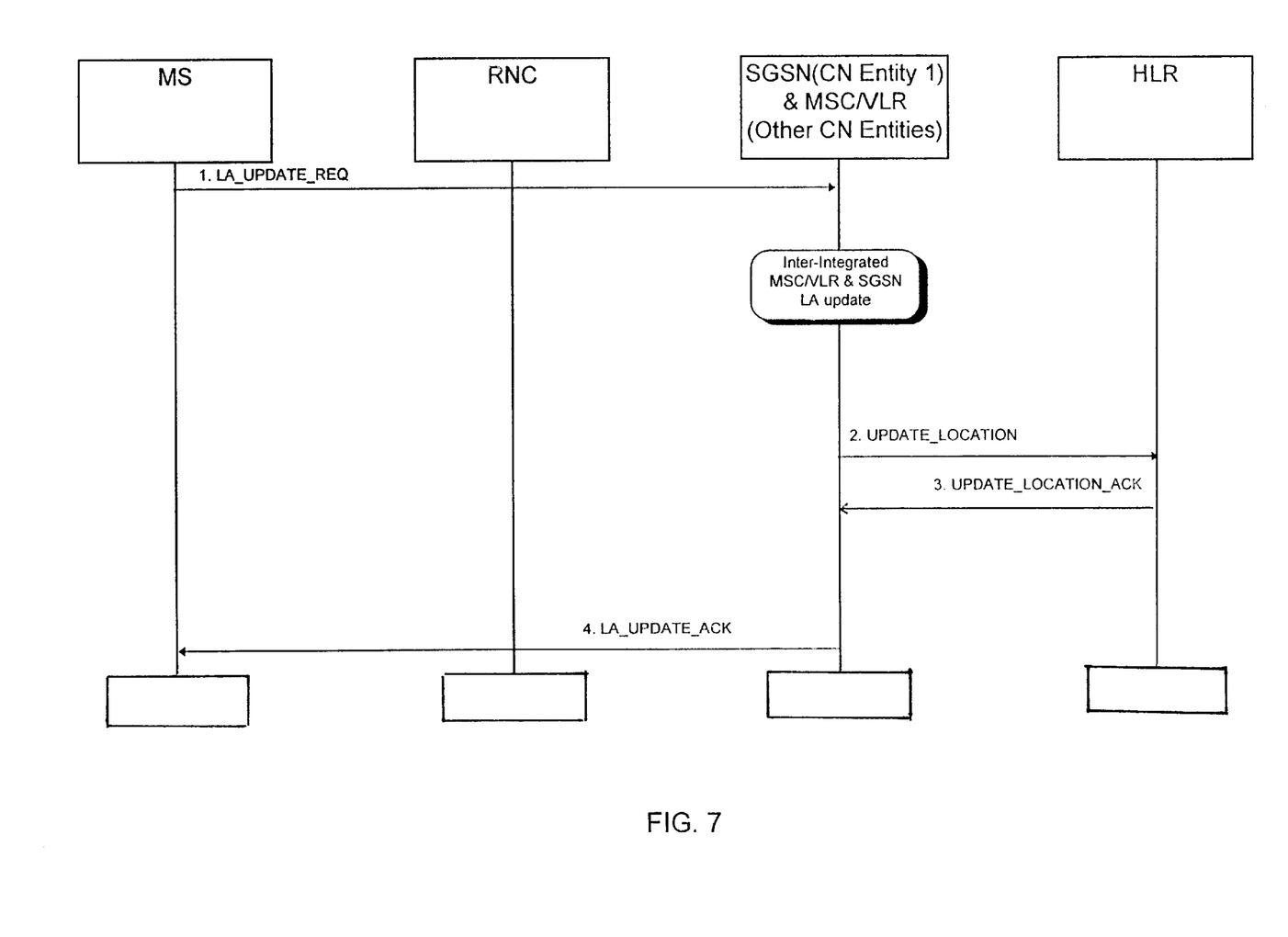
FIG. 7 illustrates one type of update procedure, i.e. a location update, of a Mobile Station (MS) in the third Core Network (CN) with integrated CN entities in accordance with the present invention.

In FIG. 1, a CN 20 has a CN entity MSC/VLR 22 and a CN entity SGSN 24. The MSC/VLR 22 and SGSN 24 are separate from each other in the CN 20. A Mobile Station (MS) 26 sends a Location Area (LA) update request 27, LA_UPDATE_REQ as shown in FIGS. 5–7, to the CN 20. There is an indicator in this Mobility Management (MM) message which describes an update type, e.g. updating all CN entities, MSC/VLR CN entities only, or SGSN CN entities only. As an example, Table 1 shows different update types. When the type in the indicator is for all entities (i.e. type=0), all CN entities including MSC/VLR CN entity and SGSN CN entity are to be updated. When the type in the indicator is for MSC/VLR CN entity only (i.e. type=1), only the MSC/VLR CN entity is updated. Similarly, when the type in the indicator is for SGSN CN entity only (i.e. type=2), only the SGSN CN entity is updated.

TABLE 1

Update type indicator

| Indicator | Update type |
|---|---|
| 0 | All entities (e.g. MSC/VLR and SGSN) |
| 1 | MSC/VLR entity only |
| 2 | SGSN entity only |

It is appreciated that other CN entities can be used within the scope of the present invention. For example, the update type can be for MSC/VLR CN entity and another CN entity only, or SGSN CN entity and another CN entity only.

The corresponding CN entity MSC/VLR 22 or SGSN 24 sends an acknowledgment message to the MS 26. The CN entity indicates in the acknowledgment message the entity that has been updated. The CN entity also indicates in the acknowledgment message the entity that is still to be updated. As an example, the following Table 2 shows several options to further update entity.

TABLE 2

Update acknowledgment indicator

| Indicator | Updated services | Possible to update |
|---|---|---|
| 0 | MSC/VLR | SGSN |
| 1 | MSC/VLR | No other entity possible |
| 2 | SGSN | MSC/VLR |
| 3 | SGSN | No other entity possible |
| 4 | MSC/VLR and SGSN | No other entity possible |
| 5 | None | SGSN |
| 6 | None | MSC/VLR |
| 7 | None | No other entity possible |

When the MSC/VLR CN entity has been updated and acknowledges that the SGSN CN entity is still to be updated (type=0), the SGSN CN entity will be updated by the MS next. When the MSC/VLR CN entity has been updated and acknowledges that no update is needed (type=1), the update procedure is complete. When the SGSN CN entity has been updated and acknowledges that the MSC/VLR CN entity is still to be updated (type=2), the MSC/VLR CN entity will be updated by the MS next. When entity has been updated and acknowledges that no update is needed (type=3), the update procedure is complete. When the MSC/VLR CN entity and SGSN CN entity have been updated and acknowledge that no update is needed (type=4), the update procedure is complete. When none of the entity has been updated (type=5), it is a default to indicate that no update is needed, and the update procedure is complete. It is appreciated that many other different options can be performed within the scope and spirit of the present invention.

Further in FIG. 1, a Radio Network Controller 28 is used between the MS 26 and the CN 20. Further, a Home Location Register (HLR) 29 holds information of which service (or entity) is subscribed to a user. Once an update request is made by the MS 26 to a CN entity, the CN entity updates the HLR 29. The HLR 29 next acknowledges the CN entity whether update is successful or failed and whether update of other CN entity is needed. Then, the CN entity acknowledges the RNC 28 or the MS 26 through the RNC 28 whether update is successful or failed and whether update of other CN entity is needed. If needed, the update of the defined CN entity continues.

In FIG. 2, exemplary CN 30 has a CN entity MSC/VLR 32 and a CN entity SGSN 34. The MSC/VLR 32 and SGSN 34 are separate from each other but connected by an interface Gs. A Mobile Station (MS) 36 sends an update request to the CN 30. Similarly, a RNC 38 is used between the MS 36 and the CN 30. Further, a Home Location Register (HLR) 39 holds information of which service (or entity) is subscribed to a user. Once an update request is made by the MS 36, the CN entity updates the HLR 39. The HLR 39 next acknowledges the CN entity whether update is successful or failed and whether update of other CN entity is needed. If needed, an update request is made by the CN entity to the other CN entity, the other CN entity updates the HLR 39. The HLR 39 next acknowledges the other CN entity whether update is successful or failed and whether update of another CN entity is needed. If needed, the update continues. When there is no update is needed, the CN entity acknowledges the RNC 38 or the MS 36 through the RNC 38 whether update is successful or failed.

In FIG. 3, an exemplary CN 40 has a CN entity MSC/VLR 42 and a CN entity SGSN 44. The MSC/VLR 42 and SGSN 44 are integrated to each other in the CN 40. A Mobile Station (MS) 46 sends an update request to the CN 40. A RNC 48 is used between the MS 46 and the CN 40. Further, a Home Location Register (HLR) 49 holds information of which service (entity) is subscribed to a user. Once an update request is made by the MS 46, the CN entity updates the HLR 49. The HLR 49 next acknowledges the CN entity whether update is successful or failed. The CN entity acknowledges the RNC 48 or the MS 46 through the RNC 48 whether update is successful or failed.

In the following exemplary cases, there are presented options how the MS may base the decision of the update type into different grounds and how the CN entity behaves in these cases:

1. MS may always try to update to all CN entities or services (e.g. see Table 1., update type=0). The CN entity sends an acknowledgment to the MS to inform the MS to which CN entity the update was successful. It is up to the MS to proceed the updating procedure to correct new CN entities if this is needed. Accordingly, the CN configuration is informed to the MS when the MS receives the acknowledgment message from the CN entity. Alternatively, the MS can obtain the CN configuration information from a Common Control Channel, e.g. a Broadcast Control Channel (BCCH) in GSM. Accordingly, when the MS has no knowledge of the CN configuration., the MS can try "dummily," and the CN may deny the update if the update is not possible to be performed in the CN.

2. Same as option 1 except that now the MS tries to update to some (it is up to the MS to decide which CN entity) CN entities (or services). The CN entity sends an acknowledgment message to the MS to inform the MS to which entity the update was successful. It is up to the MS to proceed the updating procedure to correct the new entities if this is needed.

3. The MS may always try to update all CN entities or services (e.g. see Table 1., update type=0). The CN entity sends an acknowledgment message to the MS to inform the MS to which CN entity the update was successful and to which CN entity the update may/must also be made (e.g. see Table 2., update acknowledgment type=0). It is noted that if the CN (e.g. public land mobile network=PLMN in GSM) does not have CN entities or the services, the CN may remove those CN entities or the services from the "must/may update list," or the MS may remove those CN entities if the MS knows the CN configuration. Alternatively, the MS can obtain the CN configuration information if the CN configuration is broadcast in a Common Control Channel, e.g. Broadcast Control Channel (BCCH) used in GSM.

4. Same as the option 3 except that now the MS tries to update to some (up to the MS to decide which CN entities) CN entities or services. The CN entity informs the MS to which entity the update was successful and to which CN entity the update may/must also be made.

5. MS may first analyze the CN configuration from information broadcast in a Common Control Channel, e.g. Broadcast Control Channel (BCCH), and then send the update/updates to the propriety CN entity/entities based on the ability of the MS, or the "willingness" of the subscriber, etc. The CN may inform in the acknowledgment message to which CN entity the MS is also able to perform update (i.e. similar to those shown in Table 2).

Figure 4:
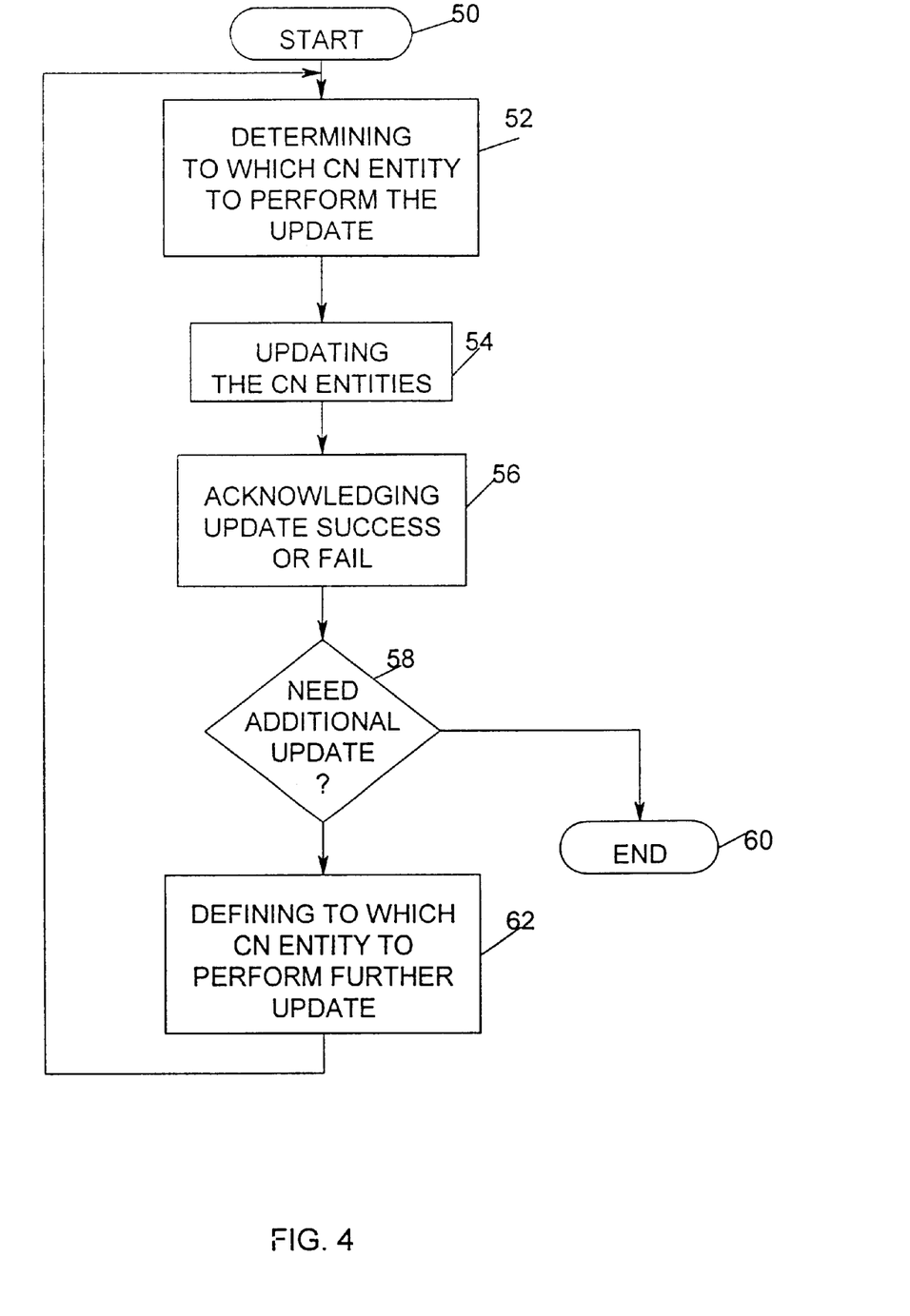
FIG. 4 illustrates a flow chart of an update procedure of a Mobile Station (MS) adapted for different types of Core Network (CN) configurations in accordance with the present invention.

FIG. 4 shows a flow chart of an update procedure of a Mobile Station (MS) adapted for different types of Core Network (CN) configurations in accordance with the present invention. It is appreciated that the flow chart is only for illustration, not for limitation, and that the steps and sequences may be varied within the principles of the present invention. The operation starts in box 50. In box 52, MS determines to which CN entity to perform the update, e.g. all CN entities, or MSC/VLR CN entity only, or SGSN CN entity only, etc. Then, in box 54, the MS updates the determined CN entity/entities. Next, in box 56, the CN entity acknowledges the update success or fail. The CN entity also acknowledges whether additional update of CN entity/entities is needed in box 58. If no, the operation ends in box 60. If additional update to the CN entity/entities is needed, the CN entity informs the MS to which other CN entity to perform further update in box 62. Then, the operation continues in box 54.

FIGS. 5, 6, 7 illustrate one of the update procedure, i.e. the location update procedure adapted for three different CN configurations. The three examples are described in the above discussed option 3. FIG. 5 shows a location update executed in a CN configuration with separate MSC/VLR CN entity and SGSN CN entity. FIG. 6 shows a location update executed in a CN configuration with separate but connected by Gs MSC/VLR CN entity and SGSN CN entity. FIG. 7 shows a location update executed in a CN configuration with integrated MSC/VLR CN entity and SGSN CN entity.

Location Update Procedure to Both Separate MSC/VLR and SGSN Entities

As shown in FIG. 5, a MS requests to attach to the CN for all possible services, e.g. both Circuit Switched (CS) and Packet Switched (PS) services offered by MSC/VLR and SGSN CN entities, respectively. The MS sends a location update message with an indicator indicating that this update is for all entities (or services). The location update message may be forwarded first to a default CN entity (e.g. a SGSN CN entity or a MSC/VLR CN entity), which updates location to a HLR. The HLR then sends subscriber data from the HLR to the CN entity, and the HLR also informs the CN entity the other services that are possible for the MS to update. The CN then sends an acknowledgment message with an indicator describing the update type that was executed successfully in the CN (e.g. SGSN CN entity has been updated and MSC/VLR CN entity is possible to update). Accordingly, in case the update type does not match with the required procedure (e.g. MS requests a SGSN CN entity, but there is no SGSN CN entity in the CN), then the MS continues with an appropriate MM message to finish the update (e.g. there is a MSC/VLR CN entity in the CN).

Accordingly, FIG. 5 illustrates the following exemplary sequence of the operation:

1. The MS sends a Location Area (LA) update to the CN. The MS indicates that it wants to perform a LA update for both CS and PS services (i.e. update type=0 (see Table 1.)).
2. The SGSN updates the location of the MS to the HLR.
3. The HLR acknowledges the update.
4. The SGSN then indicates to the MS that the LA update of the SGSN (or for PS service) was successful, and that the user has also subscribed MSC/VLR (or CS service), i.e. update acknowledgment type=2, see Table 2).
5. Based on the LA update acknowledgment sent by the SGSN, the MS sends a LA update that is routed to the MSC/VLR by the RNC, i.e. update type=1 (see Table 1).
6. The MSC/VLR updates the location of the MS to the HLR.
7. The HLR acknowledges the update.
8. The MSC/VLR then indicates to the MS that the LA update was successful for the MSC (or for CS services), i.e. update acknowledgment type=3 (see Table 2).

It is appreciated that the steps or sequence of the above operation can be varied within the principles of the present invention.

Location Update Procedure to Both Separate MSC/VLR and SGSN Entities Connected by Gs Interface As shown in FIG. 6, the MS performs a location update message when the MS makes an attach to the CN, or the MS enters a new Location Area (LA) while the MS has both SGSN and MSC/VLR attached and in the idle state.

1. The MS sends an update to the CN. The MS indicates that it requests to perform a Location Area update (LA) update for both CS and PS services, i.e. update type=0 (see Table 1).
2. If LA update is an inter-SGSN update, then the HLR is informed.
3. The HLR sends acknowledgment back to the SGSN.
4. The SGSN sends the LA update to the MSC/VLR via a network Gs interface.
5. If the LA update is an inter-MSC/VLR update, then the HLR is informed.
6. The HLR sends acknowledgment back to the MSC/VLR.
7. The MSC/VLR sends acknowledgment back to the SGSN.
8. The SGSN sends to the MS an update accept message which indicates that both CS and PS service update was successful, i.e. update acknowledgment type=4 (see Table 2).

It is appreciated that the steps or sequence of the above operation can be varied within the principles of the present invention.

Location Update Procedure to Integrated MSC/SGSN Entity

FIG. 7 illustrates the following exemplary sequence of the operation in the CN configuration having integrated MSC/SGSN CN entity:

1. The MS sends an update to the CN. The MS indicates that it requests to perform a LA update for both CS and PS services, i.e. update type=0 (see Table 1).

2. If the LA update is inter-Integrated MSC/SGSN update, then the HLR is informed.
3. The HLR sends acknowledgment back to the Integrated MSC/SGSN.
4. The Integrated MSC/SGSN sends to the MS an update accept message which indicates that both CS and PS service update was successful, i.e. update acknowledgment type=4 (see Table 2).

It is appreciated that the steps or sequence of the above operation can be varied within the principles of the present invention. The above examples illustrate that all entities are requested to be updated (update type=0 in Table 1). It is appreciated that other update type, i.e. type=1, 2, etc. can be illustrated within the scope of the present invention. Accordingly, the present invention enables means for handling different kinds of CN architectures or configurations when MS is executing MM procedures in a mobile network system.

It is appreciated that other embodiments of location update procedure as described above can be used with modification within the scope and principles of the present invention. For example, besides MS, any other network elements, such as RNC or CN entity, etc., can be arranged, configured, or implemented to have an indicator to determine to which CN entity to perform the location update. It is also appreciated that besides MS, any other network elements, such as RNC or CN entity, etc. can be used to update the CN entity or other CN entity, respectively. Further, it is appreciated that besides CN entity, any other network element, such as RNC, etc., can be used to acknowledge whether update is successful or failed and also define to which CN entity to perform further update.

Figure 8:
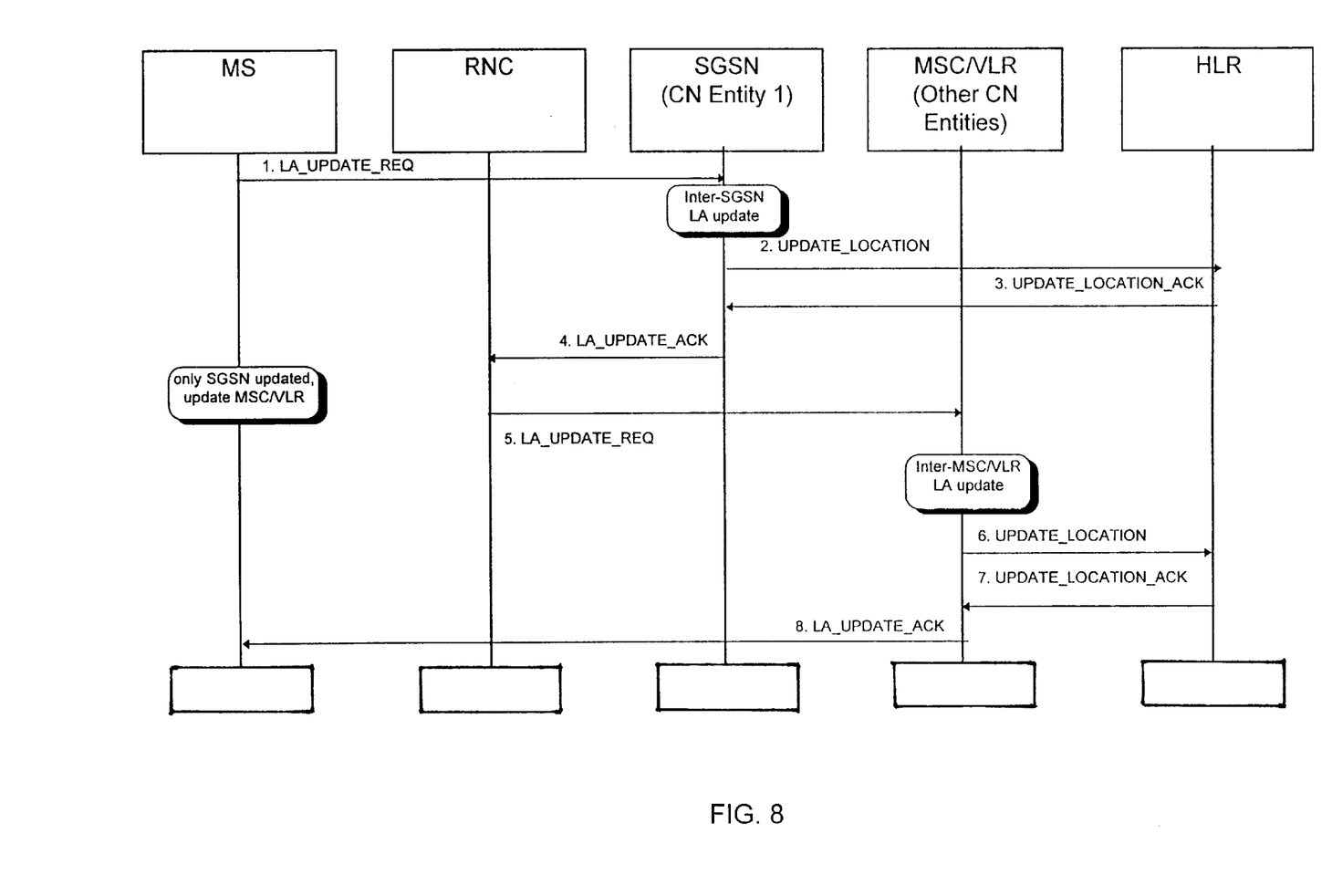
FIG. 8 illustrates an alternative embodiment of one type of update procedure, i.e. a location update, of a Mobile Station (MS) in the first Core Network (CN) with separate CN entities as shown in FIG. 5.
Figure 9:
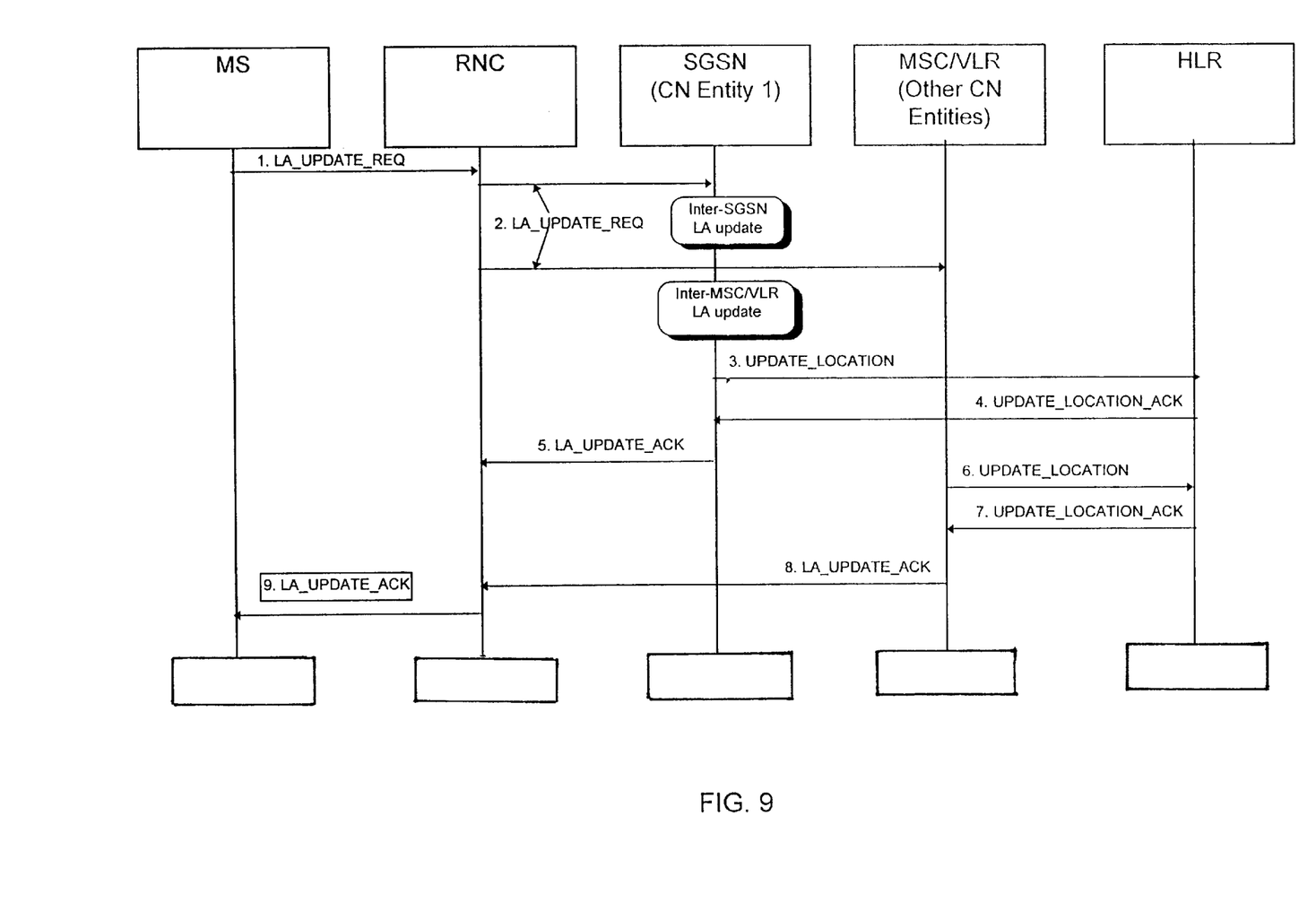
FIG. 9 illustrates another alternative embodiment of one type of update procedure, i.e. a location update, of a Mobile Station (MS) in the first Core Network (CN) with separate CN entities as shown in FIG. 5.

Within many modified embodiments in accordance with the principles of the invention, examples are shown in FIGS. 8 and 9. In FIG. 8, the operation of the location update procedure is similar to that of shown in FIG. 5, except that the SGSN indicates to the RNC, instead of the MS, that the LA update of the SGSN was successful or failed (see step 4 in FIG. 8) and that the user has also subscribed MSC/VLR; and except that the RNC, instead of the MS, sends a LA update to the MSC/VLR (see step 5 in FIG. 8). In FIG. 9, the operation of the location update procedure is similar to that of shown in FIG. 5, except that the MS sends a Location Area (LA) update to the RNC (see step 1 in FIG. 9). If the MS indicates that both CS and PS services should be updated, then the RNC sends LA update to both the SGSN and the MSC/VLR (see step 2 in FIG. 9), and the SGSN and the MSC/VLR update the HLR, respectively, and then acknowledge the RNC (see steps 5 and 8 in FIG. 9) which in turn acknowledges the MS (see step 9 in FIG. 9).

It is also appreciated that the Circuit Switch (CS) or Packet Switch (PS) attach/detach Mobility Management (MM) procedures can be implemented in a similar manner without departure from the spirit or scope of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing a mobility management procedure of a Mobile Station (MS) in a Core Network (CN) of a mobile telecommunication system, the CN including CN entities of a plurality of CN entity types, the CN entity types providing a different set of services including circuit switched CN entity MSC/VLR (Mobile Switching Center/Visitor Location Register) for providing a circuit switched service and a packet switched CN entity SGSN (Serving GPRS Support Node) for providing a packet switched service, comprising:
   a) determining, by the MS, to which CN entity types to perform the update procedure, and selecting a CN entity to which to perform the update;
   b) updating, by the MS, the selected CN entity;
   c) acknowledging the MS, by the selected CN entity, whether update is successful or failed; and
   d) acknowledging the MS, by the selected CN entity, whether update of other CN entity is needed, if needed, defining, by the selected CN entity, to which other CN entity to perform update, and continuing b)–d), wherein the MS has a indicator which defines an update type, the update type including one of: all CN entities; one type of CN entity only, such that if the indicator has the update type of all CN entities, the MS updates the all CN entities; and if the indicator has the update type of one type of CN entity only, the MS updates the one type of CN entity only, and wherein the plurality of the CN entities include a SGSN (Serving GPRS Support Node) CN entity, a MSC/VLR (Mobile Switching Center/Visitor Location Register) CN entity, such that if the indicator has the update type of all CN entities, the MS updates the all CN entities including all of the SGSN CN entity and the MSC/VLR CN entity; if the indicator has the update type of SGSN CN entity only, the MS updates the SGSN CN entity only; if the indicator has the update type of MSC/VLR CN entity only, the MS updates the MSC/VLR CN entity only.

2. The method of claim 1, wherein the plurality of the CN entities include a SGSN (Serving GPRS Support Node) CN entity, a MSC/VLR (Mobile Switching Center/Visitor Location Register) CN entity.

3. The method of claim 1, wherein the CN is a CN with separate MSC/VLR CN entity and SGSN CN entity, wherein if the indicator has the update type of all entities, the MS registers the MSC/VLR CN entity, the CN acknowledges that the update of the MSC/VLR CN entity is successful and that update of SGSN CN entity is needed.

4. The method of claim 3, wherein upon receipt of the acknowledgment from the CN that update of SGSN CN entity is needed, the MS registers the SGNS CN entity, the CN acknowledges that the update of the SGSN CN entity is successful and that no update of other entity is needed.

5. The method of claim 1, wherein the CN is a CN with separate MSC/VLR CN entity and SGSN CN entity, wherein if the indicator has the update type of all entities, the MS registers the SGSN CN entity, the CN acknowledges that the update of the SGSN CN entity is successful and that update of MSC/VLR CN entity is needed.

6. The method of claim 5, wherein upon receipt of the acknowledgment from the CN that update of MSC/VLR CN entity is needed, the MS registers the MSC/VLR CN entity, the CN acknowledges that the update of the MSC/VLR CN entity is successful and that no update of other entity is needed.

7. The method of claim 1, wherein the CN is a CN with separate MSC/VLR CN entity and SGSN CN entity, wherein if the indicator has the update type of MSC/VLR CN entity only, the MS registers the MSC/VLR CN entity, the CN acknowledges that the update of the MSC/VLR CN entity is successful and that no update of other CN entity is needed.

8. The method of claim 1, wherein the CN is a CN with separate MSC/VLR CN entity and SGSN CN entity, wherein if the indicator has the update type of SGSN CN entity only, the MS registers the SGSN CN entity, the CN acknowledges that the update of the SGSN CN entity is successful and that no update of other CN entity is needed.

9. The method of claim 1, wherein the CN is a CN with separate but connected by Gs interface MSC/VLR CN entity and SGSN CN entity.

10. The method of claim 1, wherein the CN is a CN with separate but connected by Gs interface MSC/VLR CN entity and SGSN CN entity, wherein if the indicator has the update type of all entities, the MS registers the MSC/VLR CN entity first and then registers the SGSN CN entity via the Gs interface, the CN acknowledges that the update of the MSC/VLR CN entity and the SGSN CN entity is successful and that no update of other entity is needed.

11. The method of claim 1, wherein the CN is a CN with separate but connected by Gs interface MSC/VLR CN entity and SGSN CN entity, wherein if the indicator has the update type of MSC/VLR CN entity only, the MS registers the MSC/VLR CN entity, the CN acknowledges that the update of the MSC/VLR CN entity is successful and that no update of other entity is needed.

12. The method of claim 1, wherein the CN is a CN with separate but connected by Gs interface MSC/VLR CN entity and SGSN CN entity, wherein if the indicator has the update type of SGSN CN entity only, the MS registers the SGSN CN entity, the CN acknowledges that the update of the SGSN CN entity is successful and that no update of other entity is needed.

13. The method of claim 1, wherein the CN is a CN with integrated MSC/SGSN CN entity.

14. The method of claim 1, wherein the CN is a CN with integrated MSC/SGSN CN entity, wherein if the indicator has the update type of all entities, the MS registers the MSC/SGSN CN entity, the CN acknowledges that the update of the MSC/SGSN CN entity is successful and that no update of other entity is needed.

15. The method of claim 1, wherein the CN is a CN with integrated MSC/SGSN CN entity, wherein if the indicator has the update type of MSC/VLR CN entity only, the MS registers the MSC CN entity, the CN acknowledges that the update of the MSC CN entity is successful and that no update of other entity is needed.

16. The method of claim 1, wherein the CN is a CN with integrated MSC/SGSN CN entity, wherein if the indicator has the update type of SGSN CN entity only, the MS registers the SGSN CN entity, the CN acknowledges that the update of the SGSN CN entity is successful and that no update of other entity is needed.

17. The method of claim 1, wherein the update includes location update.

18. The method of claim 1, wherein the update includes a circuit switch attach/detach.

19. The method of claim 1, wherein the update includes a packet switch attach/detach.

20. A system of providing an update procedure in a mobile telecommunication system, comprising:
   a Core Network (CN), the CN including CN entities of a plurality of CN entity types, the CN entity types providing a different set of services including circuit switched CN entity MSC/VLR (Mobile Switching Center/Visitor Location Register) for providing a circuit switched service, and a packet switched CN entity SGSN (Serving GPRS Support Node) for providing a packet switched service;
   a Mobile Station (MS), the MS determining to which CN entity types to perform the update procedure, selecting a CN entity to which to perform the update, and updating the selected CN entity; and
   wherein after update of the selected CN entity, the selected CN entity acknowledging the MS whether update is successful or failed, and whether update of other CN entity is needed, if needed, the CN defining to which of other CN entity to perform update and continuing update of the other CN entity, and wherein the MS has an indicator which defines an update type, the update type including one of: all CN entities; one type of CN entity only, such that if the indicator has the update type of all CN entities, the MS updates the all CN entities; and if the indicator has the update type of one type of CN entity only, the MS updates the one type of CN entity only, and wherein the plurality of the CN entities include a SGSN (Serving GPRS Support Node) CN entity, a MSC/VLR (Mobile Switching Center/Visitor Location Register) CN entity, such that if the indicator has the update type of all CN entities, the MS updates the all CN entities including all of the SGSN CN entity and the MSC/VLR CN entity; if the indicator has the update type of SGSN CN entity only, the MS updates the SGSN CN entity only; if the indicator has the update type of MSC/VLR CN entity only, the MS updates the MSC/VLR CN entity only.

21. The system of claim 20, wherein the CN is a CN with separate MSC/VLR CN entity and SGSN CN entity, wherein if the indicator has the update type of all entities, the MS registers the MSC/VLR CN entity, the CN acknowledges that the update of the MSC/VLR CN entity is successful and that update of SGSN CN entity is needed.

22. The system of claim 21, wherein upon receipt of the acknowledgment from the CN that update of SGSN CN entity is needed, the MS registers the SGNS CN entity, the CN acknowledges that the update of the SGSN CN entity is successful and that no update of other entity is needed.

23. The system of claim 20, wherein the CN is a CN with separate MSC/VLR CN entity and SGSN CN entity, wherein if the indicator has the update type of all entities, the MS registers the SGSN CN entity, the CN acknowledges that the update of the SGSN CN entity is successful and that update of MSC/VLR CN entity is needed.

24. The system of claim 23, wherein upon receipt of the acknowledgment from the CN that update of MSC/VLR CN entity is needed, the MS registers the MSC/VLR CN entity, the CN acknowledges that the update of the MSC/VLR CN entity is successful and that no update of other entity is needed.

25. The system of claim 20, wherein the CN is a CN with separate MSC/VLR CN entity and SGSN CN entity, wherein if the indicator has the update type of MSC/VLR CN entity only, the MS registers the MSC/VLR CN entity, the CN acknowledges that the update of the MSC/VLR CN entity is successful and that no update of other CN entity is needed.

26. The system of claim 20, wherein the CN is a CN with separate MSC/VLR CN entity and SGSN CN entity, wherein if the indicator has the update type of SGSN CN entity only, the MS registers the SGSN CN entity, the CN acknowledges that the update of the SGSN CN entity is successful and that no update of other CN entity is needed.

27. The system of claim 20, wherein the CN is a CN with separate but connected by Gs interface MSC/VLR CN entity and SGSN CN entity.

* * * * *